United States Patent [19]
Holien et al.

[11] Patent Number: 5,197,068
[45] Date of Patent: Mar. 23, 1993

[54] INTRA CHANNEL BANK COMMUNICATION PROTOCOLS BETWEEN CHANNELS AND THE LINE INTERFACE UNIT OF A TELEPHONE SYSTEM

[75] Inventors: David L. Holien, Parker; Joseph M. Elder, Boulder; David J. Farrell, Lafayette, all of Colo.

[73] Assignee: XEL Communications, Inc., Aurora, Colo.

[21] Appl. No.: 574,440

[22] Filed: Aug. 23, 1990

[51] Int. Cl.$^5$ .............................................. H04J 3/12
[52] U.S. Cl. .............................. 370/110.4; 370/110.1
[58] Field of Search ............... 370/79, 84, 109, 110.1, 370/112, 110.4; 375/25; 379/399

[56] References Cited

U.S. PATENT DOCUMENTS

| | | | |
|---|---|---|---|
| 4,245,340 | 1/1981 | Landry | 370/111 |
| 4,627,047 | 12/1986 | Pitroda et al. | 370/110.1 |
| 4,636,584 | 1/1987 | Binkerd et al. | 370/110.1 |
| 4,730,312 | 3/1988 | Johnson et al. | 370/110.1 |
| 4,740,963 | 4/1988 | Eckley | 370/84 |
| 4,823,342 | 4/1989 | Morita et al. | 370/79 |
| 4,849,972 | 7/1989 | Hackett et al. | 370/110.1 |

OTHER PUBLICATIONS

Bell System Technical Journal entitled "The D4 Digital Channel Bank Family" Nov., 1982, vol. 61, No. 9, Part 3.

*Primary Examiner*—Douglas W. Olms
*Assistant Examiner*—T. Samuel
*Attorney, Agent, or Firm*—Dorr, Carson, Sloan & Peterson

[57] ABSTRACT

A method of providimg two-way communication between a plurality of channel units in a channel bank and a line interface circuit of a telephone system utilizing a receive direction protocol and a separate transmit direction protocol. The receive direction protocol identifies the channel unit to which provisioning data is to be delivered, increases the bandwidth of the voice data region in the time slot corresponding to the identified channel unit, superposes the provisioning data in the time slot with the voice data, and delivers the superposed data to the channel unit wherein the provisioning data is separated from the voice data. The transmit direction protocol utilizes the A and B signaling bits corresponding to the eighth bit of an identified time slot in the sixth and twelfth transmit frames wherein two bits of an eight bit status message is delivered on every other superframe. The two-way communication protocols occur without affecting or interfering with the PCM voice data.

12 Claims, 7 Drawing Sheets

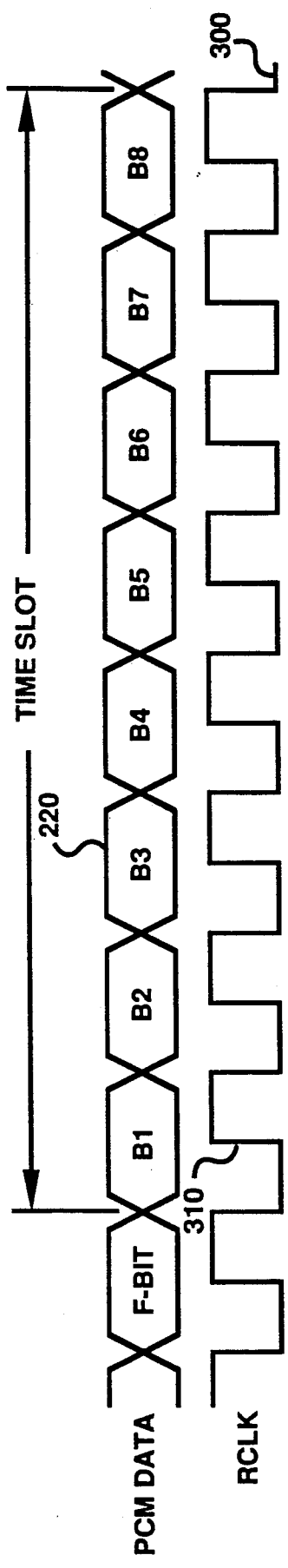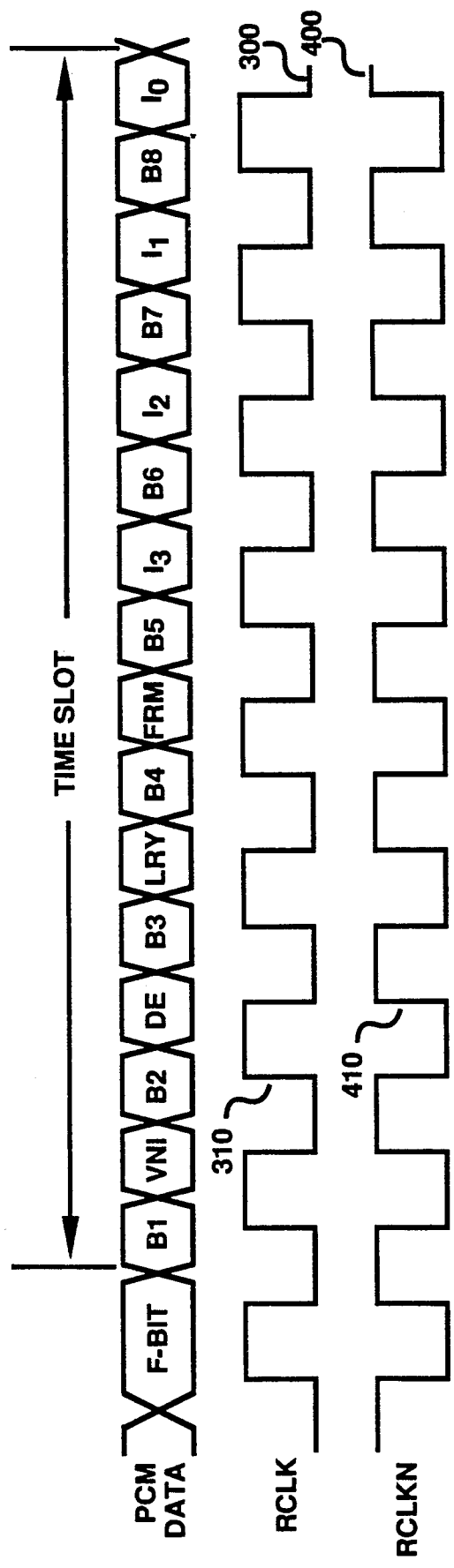
FIGURE 3 (PRIOR ART)
FIGURE 4

INTRA CHANNEL BANK COMMUNICATION PROTOCOLS BETWEEN CHANNELS AND THE LINE INTERFACE UNIT OF A TELEPHONE SYSTEM

BACKGROUND OF THE INVENTION

1. Field of the Invention

The present invention relates to a digital communication protocol between channel units and the line interface unit in a channel bank of a telephone system and, in particular, pertains to the delivery of provisioning control, information from a system controller through the line interface unit to a channel unit for the automatic provisioning and testing of the channel unit and for delivery of status information back from the channel unit through the line interface unit to the system controller respecting the channel unit over the PCM data path.

2. Statement of the Problem

The American Telephone and Telegraph Company provides the D4 digital channel bank family commercially to operating companies and other telephone companies. The characteristics of the D4 digital channel bank family are fully discussed in the November, 1982, Volume 61, No. 9, Part 3, issue of the Bell System Technical Journal entitled "The D4 Digital Channel Bank Family."

In FIG. 1 (prior art) the D4 channel bank is shown in block diagram. Conventionally, twenty-four channel units 100a comprise the DIGROUP A voice/data circuits and twenty-four channel units 100b comprise the DIGROUP B voice/data circuits. These channel units 100 are conventionally interconnected to the following common equipment. Each channel unit 100 is connected to a transmit unit 110 and to a receive unit 120. A channel unit 100 receives voice or data signals from the receive unit 120 and transmits voice or data signals to the transmit unit 110. A line interface unit 130 interfaces the channel units 100 with a digital facility.

In addition, FIG. 1 also shows an alarm control unit 140, a trunk processing unit 150, an office interface unit 160, DC to DC converters 170, power distribution unit 180, and a transmit pre-equalizer 190 as part of the common equipment in an existing D4 terminal. Each of these components are well known and fully discussed in the aforesaid reference and are not important to the teachings of the present invention.

In typical operation, analog voice signals appearing on lines 112 are converted by the channel units 100 into a pulse amplitude modulated (PAM) signal. The PAM signal is delivered from the channel units 100 over bus 103 referred to as the PAM bus through the transmit unit 110a where it is converted to a pulse code modulated (PCM) signal. The PCM signal is sent over the transmit bus 104 to the line interface unit 130 where the PCM voice data is then delivered over lines 132 through the transmit pre-equalizer circuit 190 and then over lines 192a to the digital interface for transmission into the telephone network. Likewise, PCM voice data on lines 192b from the telephone network can be delivered into the line interface unit 130 for delivery over the PCM receive bus 106 into the receiver unit 120, converted to a PAM Signal and sent over bus 109 to the channel units 100. Channel unit converts these PAM signals into voice signals for delivery on lines 112. Hence, two-way voice communication is accomplished. In addition to providing two-way voice communication, the D4 channel bank can provide two-way digital data a communication. The channel units 100 are plug in replaceable modules. When a voice channel unit is replaced with a data channel unit, two-way digital communication is provided. The digital data appearing on line 112 are formatted by the channel unit and delivered to the transmit unit 110 over but 102 which is referred to as the PCM bus. The transmit unit multiplexes the signals from the PCM bus 102 and the PAM bus 103 onto the PCM transmit bus 104. Signals from the PCM receive bus 106 are demultiplexed by the receive unit and sent to the channel units 100 on the PCM bus 108 and the PAM bus 109. A data channel unit 100 receives data from the PCM bus 108, formats it and applies it to line 112 associated with the channel unit.

In FIG. 2 (prior art) the superframe timing utilized in the channel bank arrangement of FIG. 1 is set forth. In FIG. 2, a superframe 200 having twelve frames is shown. Each frame has a frame bit ($F_t$ or $F_s$). The frame bits $F_t$ and $F_s$ alternate and provide a unique pattern. The $F_t$ bits provide terminal synchronization and the $F_s$ bits provide signaling synchronization. The $F_t$ and $F_s$ bits are interweaved to form a superframe pattern which typically is 100011011100 with the $F_t$ bits forming the pattern 101010 and the $F_s$ bits forming the pattern 001110. In a given frame 210, the F bit is followed by twenty-four DS0 channels of data. Each channel of data 220 includes eight voice data bits. These eight bits are also known as a single DS0 channel. These channel bits, in the arrangement of FIG. 1 are typically delivered at 1.544 megabits per second. The eighth bit of data in channel 220 may be used for signaling information (such as off hook) in the sixth and twelfth frames 210 of the superframe 200 according to conventional protocol. The transmit unit 110, in FIG. 1, provides a transmit superframe sync signal (wiring option H for D4 channel banks) in order for the channel units 100 to determine the position of the sixth and twelfth frames of the transmit PCM signal.

A need exists to have a PC based system controller 10 send provisioning and control information from a remote location such as an administrative office to a particular channel unit 100 in order to properly configure the channel unit, for example, setting an option on the channel unit 100 such as setting gain, adjusting impedance, etc. Likewise, a need exists for a channel unit 100 to provide information back to the system controller such as a status message or the like. A need further exists to obtain this two-way communication between the controller 10 and channel unit 100 (i.e., sending a provisioning message in one direction and sending a status message in the other direction) without providing additional back plane connections or other dedicated paths which would be costly to install in existing channel bank locations.

The 1981 patent to Landry (U.S. Pat. No. 4,245,340) although directed to communications between channel banks, discusses in the Background of the Invention Section that one or more bits from the voice data in a channel 220 of FIG. 2 may be borrowed for communication purposes. However, Landry recognized that this approach introduces unacceptable transmission impairments. Landry further recognizes that the communication link must occur in such a fashion that the overall signaling capacity of the channel is not reduced. Hence, Landry sets forth a protocol for utilizing a major portion of the signaling subframe channel for achieving interchannel bank communication.

The 1989 patent to Hackett et al. (U.S. Pat. No. 4,849,972) pertains to a digital data communications terminal and module therefore. This patent sets forth a technique for the insertion of data into the PCM data stream being received from the digital signal line as well as into the data stream being transmitted over the digital signal line. This is accomplished by the borrowing of PCM data in a selected time slot as discussed in the Landry patent (col. 1, line 55) and the insertion of data in the selected time slot for the automatic testing and provisioning of a channel unit corresponding to the time slot. For this approach to operate, the PCM voice data in the time slot is excluded and, if used during voice transmission, impairment to the voice data would result. Indeed, the '972 patent teaches the substitution of the provisioning data in the appropriate time slot over consecutive frames. While the '972 approach may be used during installation when voice data is not being transmitted, it is not acceptable during voice transmission.

Hence, a further need exists for a system which provides intra bank communication between channel units and the line interface unit that is fully transparent to the transmittal of voice data in the telephone system.

An integrated voice and data telecommunication system is set forth in U.S. Pat. No. 4,627,047 which utilizes a 10 bit PCM word —8 bits for voice or data, one bit for parity, and one bit of data information. U.S. Pat. No. 4,636,584 sets forth a channel unit for converting between two different signaling protocols.

3. Solution to the Problem

The present invention provides a solution to the aforesaid problem by providing two separate types of digital communication protocols between the line interface unit 130 and the channel units 100. These communication protocols operate without interfering or excluding the PCM voice data in the receive and transmit directions and further operates with minimal distortion to the A and B signaling information PCM data in the transmit direction. The present invention provides for a dual protocol system that is effectively transparent to the conventional operation of the channel bank which does not distort, disturb, or exclude the voice data.

SUMMARY OF THE INVENTION

A method of providing two-way communication between a plurality of channel units in a channel bank and a line interface circuit of a telephone system utilizing a receive direction protocol and a separate transmit direction protocol. The receive direction protocol identifies the channel unit to which provisioning data is to be delivered, increases the bandwidth of the time slot corresponding to the identified channel unit, superposes the provisioning data (and other control data) in the time slot with the voice data, and delivers the superposed data to the channel unit wherein the provisioning data is separated from the voice data. The transmit direction protocol utilizes the A and B signaling bits corresponding to the eighth bit of an identified time slot in the sixth and twelfth transmit frames wherein two bits of an eight bit status message are delivered on every other superframe. The two-way communication protocols function without affecting or interfering with the PCM voice data.

DESCRIPTION OF THE DRAWING

FIG. 3 sets forth the timing of a prior art PCM data channel;

FIG. 4 sets forth the receive direction protocol of the present invention;

DETAILED DESCRIPTION

Figure 1:
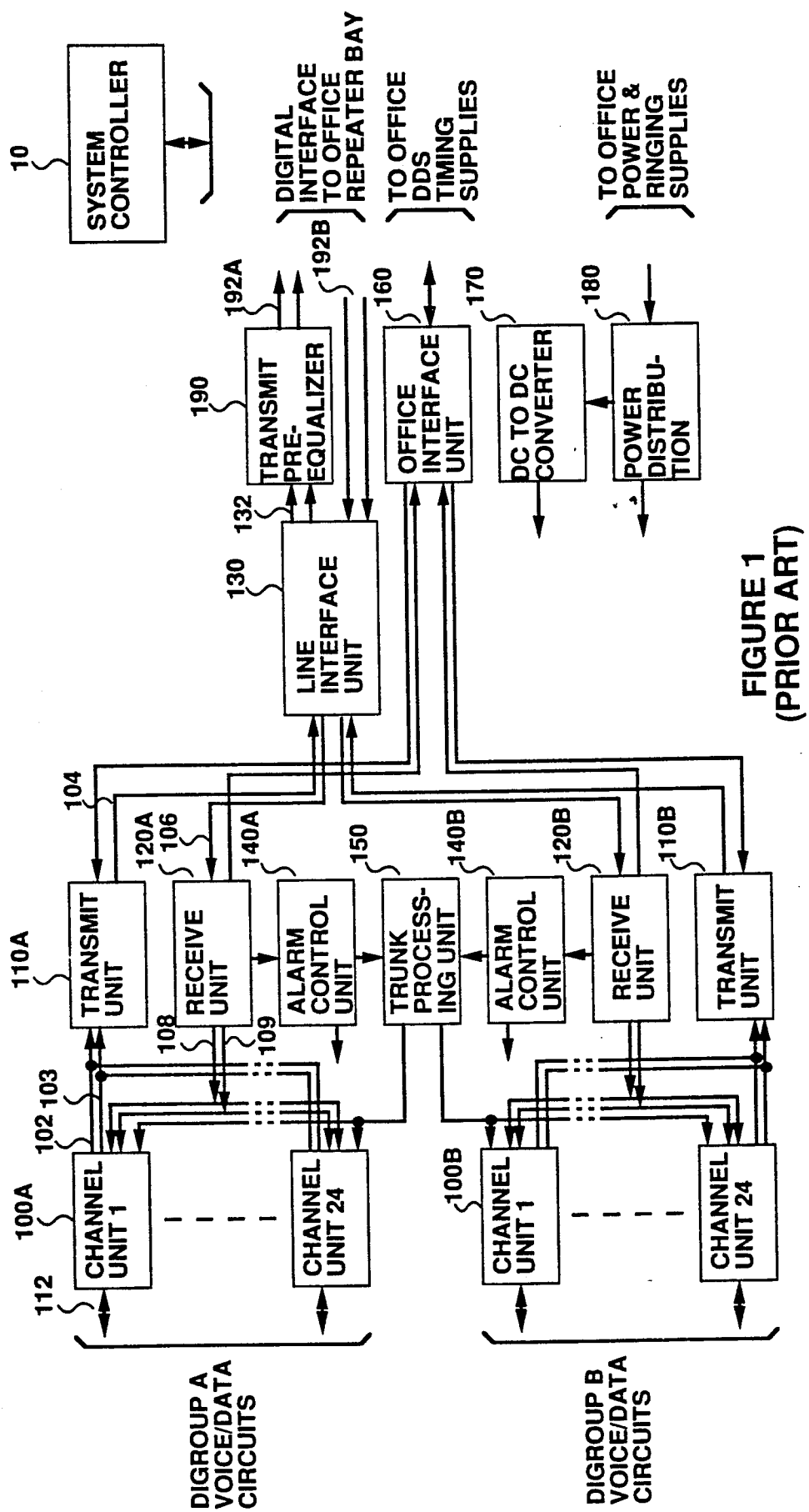
FIG. 1 sets forth a block diagram of the prior art D4 digital channel bank family.

The intrabank communications protocols of the present invention which are particularly adapted to the AT&T D4 system provides a communications link between the line interface unit 130 of FIG. 1 and all of the channel units 100. The communications protocol requires no additional wiring in the back plane between the line interface unit 130 and the channel units 100. Rather, as the line interface units 130 and channel units 100 are selectively replaced they are replaced with line interface units and channel units modified, under the teachings of the present invention, to have microprocessor controls. As these new units 100 and 130 are added, the modified line interface unit acts as the communications hub for the entire channel bank. It is to be understood that in the channel bank, some of the channel units 100 are modified according to the teachings of the present invention and some are not. Regardless of the mixture between the modified and existing channel units 100, the modified line interface unit 130 of the present invention is fully transparent to the conventional operation of the AT&T D4 system. However, with respect to the communication between the modified line interface unit 130 and the modified channel units 100, provisioning commands and status queries can be delivered and received. The communications link, in the direction from the line interface unit 130 occurs on the receive pulse code modulation (PCM) data busses and 108 and is termed the "receive direction protocol." The communications link, in the direction from the channel units 100 to the line interface unit 130 occurs on the transmit PCM busses 102 and 104 is termed the "transmit direction protocol."

The following discusses the two separate protocols utilized by the present invention.

1. Receive Direction Protocol

Figure 2:
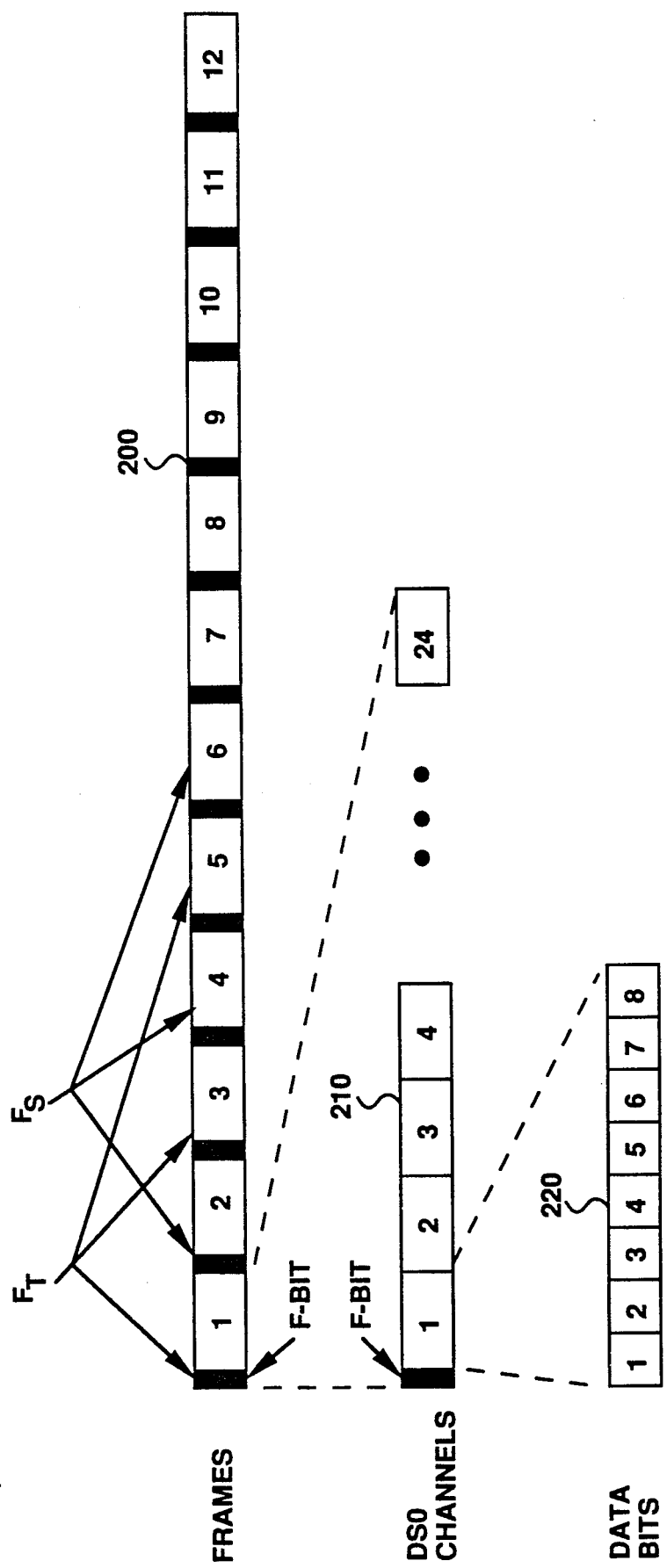
FIG. 2 sets forth the prior art superframe timing and PCM data format.

With reference to FIG. 1, the receive direction protocol is so termed because the communication of the provisioning data is delivered from the line interface unit 130 over the receive PCM communications bus 106 into the receive unit 120 for delivery over bus 108 to channel unit 100. The PCM superframe format is shown in FIG. 2 with the eight bits of voice data for a channel shown as 220. Channel 220 is delivered to one of channel units 100.

This is further detailed in FIG. 3 where the eight voice data bits of the time slot 220 for channel 1 are shown as a PCM data stream with the first bit being the F-bit followed by the eight bits of voice data B1-B8. A clock 300 (termed RCLK for receive clock) is also shown. The receive clock pulses 300 are used to read each of the eight bits from the time slot 220 in the channel unit corresponding to the channel of data. Each bit is read on the leading edge 310 of the receive clock 300. This timing format is conventional in the prior system of FIG. 1.

It is well known in the art how to identify which channel of data 220 corresponds to which channel unit 100.

As will be explained, the present invention identifies which channel unit 100 is to receive provisioning and control data, essentially doubles the bandwidth of the time slot for the identified channel, and multiplexes the provisioning and control data with the voice data so that every other bit in the resultant multiplexed data stream is a voice data bit. The provisioning and control data bit appears in one-half of the conventional voice data bit period. This is shown in FIG. 4. Bandwidth doubling of the time slot occurs in all channels 220 at all times with idle data being inserted in other channels when provisioning and control data is not being delivered to a particular channel unit.

In FIG. 4, the time slot for the identified channel is of the same duration as is found in the time slot of FIG. 3. The time slot, of course, corresponds to a channel 220 of voice data in the frame 210. The bandwidth of the time slot, after the F-bit, is doubled (i.e., from 64 Kb/s to 128 Kb/s the voice data B1 through B8 is preserved and the provisioning and control data is superposed over the voice data so that every other bit is a voice data bit. The multiplexed provisioning and control data, as shown in FIG. 4, comprises the following bits: VNI, DE, LRY, FRM, and I0-I3. As before, the receive clock in the identified channel uses the leading edge 310 to read the voice data. The PCM data 220, however, is slightly delayed under the present invention so as to have the leading edge 310 align with the middle of the voice data bit. A second clock 400 (identified as RCLKN for negated receive clock) uses the leading edge 410 to read the provisioning and control data.

While the present invention doubles the bandwidth of the time slot, it is to be expressly understood that variations of the present invention could be based upon any approach that increases the bandwidth of the time slot to carry additional information. Likewise, while provisioning and control data may be alternated as shown in FIG. 4, other patterns to superpose data without interfering with the voice data may also be used. Finally, while 8 bits of provisioning and control data are delivered, the actual message from the line interface unit to an identified channel unit may constitute a number of such 8-bit segments.

2. Transmit Direction Protocol

Figure 5:
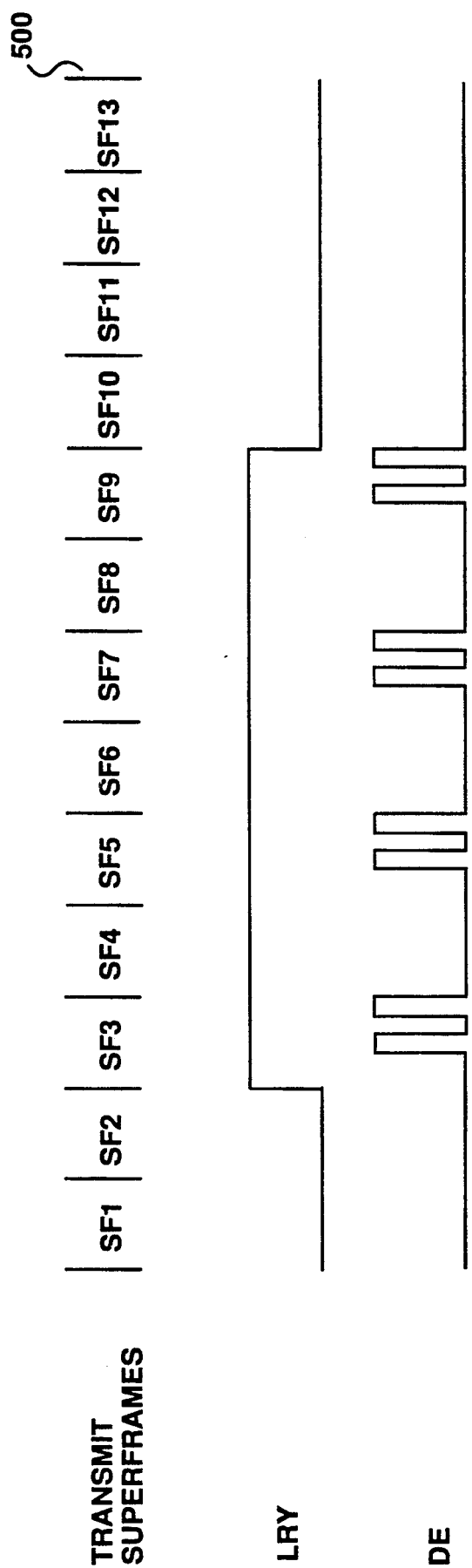
FIG. 5 sets forth the timing between the transmit of the superframes from the channel units to the line interface unit and the transfer commands of the present invention.

With reference to FIG. 1, the transmit direction protocol is so termed because the communication of status data is delivered from the channel units 100 over bus 102 to the transmit unit 110 for delivery over the PCM transmit bus 104 to the line interface unit 130. In FIG. 5, the transmit superframes 500 are shown on bus 104 from the transmit unit.

In the transmit direction, a different protocol must be used. Because the bus 102 is connected to the transmit unit 110, the transmit unit 110 re-times the data and, therefore, it is not possible to double the bandwidth of the time slot as discussed above. Rather, the status data from the channel units 100 are communicated to the line interface unit 130 as illustrated in FIG. 6.

In the above receive direction protocol, two of the control data bits are: LRY (Line interface unit Read) and DE (Data Enable). These bits are used to synchronize and coordinate transmission of status information from the channel unit superframes to the line interface unit. Data bit LRY when set indicates that the line interface unit 130 is ready to receive status data from the channel units 100. Hence, in FIG. 5, the LRY is shown to be high or enabled during superframes SF3 through SF9 indicating the line interface unit is ready to receive status information. It is to be expressly understood that any configuration of contiguous superframes could be also utilized.

Likewise, in FIG. 5, the DE pulse is also shown. The data enable pulse DE provides for the transfer of one bit of status data from a channel unit 100 to the line interface unit.

Figure 6:
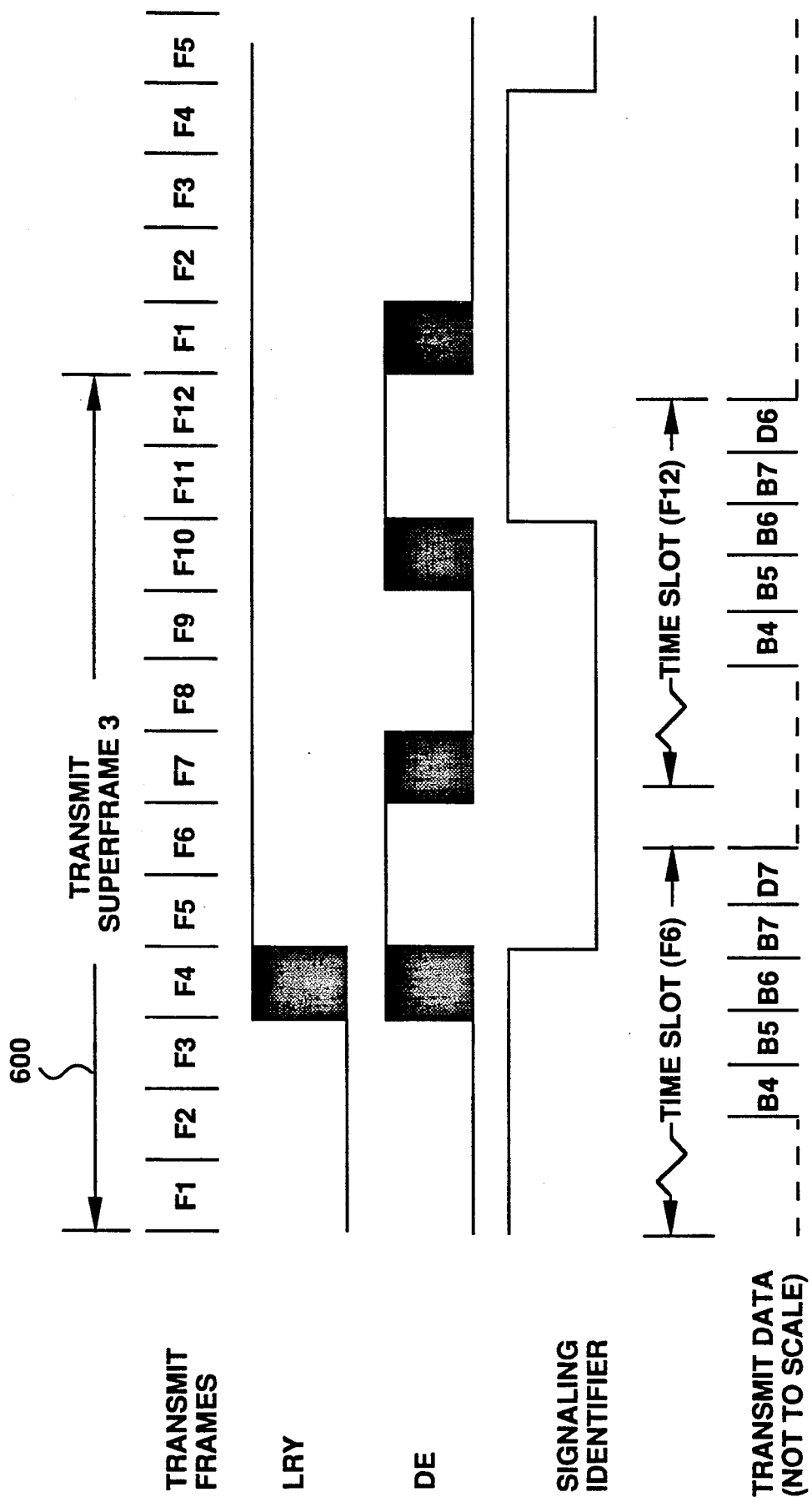
FIG. 6 sets forth the transmit direction protocol of the present invention.

In FIG. 6, a single superframe 600 is shown comprised of individual transmit frames F1 through F12. The LRY and DE pulses from FIG. 5 are also shown in timing relationship to superframe 3. The darkened areas are "don't care" or "indeterminate" areas caused by the random frame alignment between the transmit and receive buses. As before, each frame F1 through F12 of a superframe contains twenty-four time slots with each time slot corresponding to a channel in the channel bank. Each time slot corresponding to a particular channel 100 contains eight bits of voice data. Frame F6 is conventionally designated the A Signaling Frame and frame 12 is conventionally designated the B Signaling Frame. A superframe sync signal referred to as the signaling identifier in FIG. 6 is provided to the channel units 100 via wiring option H. From this signal the channel units 100 can determine with certainty the position of the signaling frames eliminating any problem which might be caused by the indeterminate edges of LRY and DE. Conventionally, the eighth bit in each time slot for frames F6 and F12 are used as signaling bits to provide supervisory status, (e.g. off-hook and ringing signaling). As shown in FIG. 6, the data transmitted for any time slot corresponding to a given channel unit 100 is shown in that channel's time slot for frame 6 and that channel's time slot for frame 12. The eighth bit in the time slot for frame 6 is designated D7 and the eighth bit for the time slot in frame 12 is designated D6 in the example of FIG. 6.

Under the transmit direction protocol of the present invention, the signaling bits (i.e., bit eight of frames 6 and 12) of every other superframe are borrowed and channel unit status data is inserted therein. This is shown in FIG. 6 for superframe 3. For example, in the following table, an eight bit status message is transferred in reference to FIG. 5 as follows:

TABLE I

| Superframe | A Signaling | B Signaling |
| --- | --- | --- |
| 3 | D7 | D6 |
| 4 | | |
| 5 | D5 | D4 |
| 6 | | |
| 7 | D3 | D2 |
| 8 | | |
| 9 | D1 | D0 |

In Table I, the status bits D0 through D7 from a given channel unit 100 are transmitted from the channel unit to the line interface unit in the A and B signaling bit positions of the time slot for that channel unit. This occurs with every other superframe as shown above until all eight bits are transferred.

Under the teachings of the present invention, the A and B Signaling Bit positions are borrowed which reduces the signaling bandwidth by fifty percent. The effect of this data impairment, however, is minimized as follows. During the transmission of the status bits $D_0$ through $D_7$, the line interface unit 130 maintains the last valid signaling state prior to the channel unit borrowing a bit for status communication and transmits that last valid value downstream. While this creates some distortion to the signaling bits for dial pulsing, it does not interfere at all with the voice data and it does not cause corruption of the signaling downstream.

It can be readily observed through the inspection of FIGS. 3 and 4 that the receive communication protocol of the present invention is capable of delivering provisioning and control data to an identified channel in the bank of channel units without excluding or disrupting the voice data also being delivered to that identified channel. This feature is an important advance over the prior approaches set forth in the background art section. Doubling of the bandwidth of the time slot permits the provisioning and control data to be superposed over the existing voice data. This is an important distinction with the '972 approach which inserts the provisioning and control data into the time slot by excluding the existing voice data.

While the preferred embodiment transfers data in 8 bit segments, it is to be expressly understood that greater or less than 8 bits could be transferred as a segment. An actual message will constitute a number of segments in order to communicate with the line interface unit.

3. Modifications to Line Interface Unit 130

Figure 7:
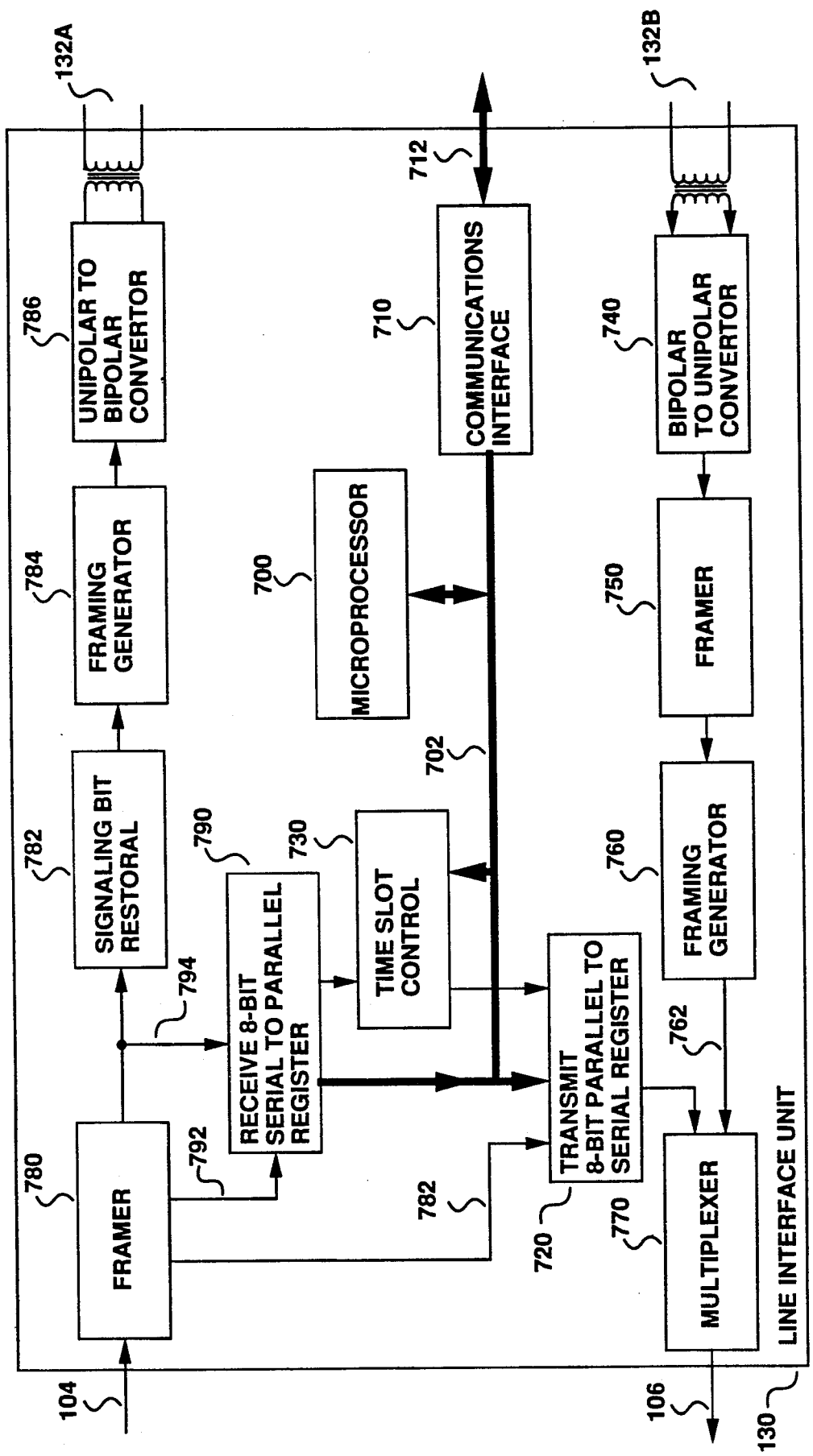
FIG. 7 is the block diagram schematic of the modified line interface unit of the present invention.

In FIG. 7, a block diagram of the line interface unit 130 setting forth the components, as they pertain to the teachings of the present invention, is set forth. Conventional elements of the line interface unit 130 such as a voltage controlled crystal oscillator, loop back control, etc. are not shown.

The line interface unit 130 receives PCM voice data as shown in FIG. 6 by the line entitled "Transmit Frames" on the transmit PCM bus 104 and outputs the PCM voice data on line 132a into the telephone network in a conventional fashion. Likewise, in-coming PCM voice data appears on lines 132b and is delivered through the line interface unit to be outputted on the receive PCM bus 106 also in a conventional fashion. The line interface unit 130 is modified to contain a microprocessor 700 which is interconnected over bus 702 to the communications interface 710 and over lines 712 to a communications network which interfaces to the system controller 10 of FIG. 1. The microprocessor, in the preferred embodiment, is an Hitachi HD63A03X. The system controller 10 is a PC based system controller such as one based on Intel 80386 microprocessor technology. The system controller delivers commands over lines 712 702 which in turn delivers information to and from the microprocessor 700. In the preferred embodiment, bus lines 712 are an RS485, asynchronous communications link.

The microprocessor 700 in response to commands from the system controller 10 writes the provisioning and control messages one nibble (i.e., four bits) at a time into an eight bit parallel to serial register 720. The nibble corresponds to bits I0 through I3 of FIG. 4. The microprocessor also writes a valid nibble bit corresponding to control bit VNI of FIG. 4 and a message delimiter bit corresponding to control bit FRM of FIG. 4. The remaining two control bits of the shift register 720 are the transmit synchronization signals DE and LRY from signal lines 782 which control the transmission of status data on the transmit side.

A time slot control 730 implemented using a MC14416 time slot assigner IC which is manufactured by Motorola is utilized to count the actual time slots (i.e., identify the channel unit to which a provisioning message is to be sent).

Hence, in operation, the system controller 10 downloads commands to the microprocessor 700 over bus lines 712, through the communications interface 710 and over bus 702 for an identified channel unit. The identified channel unit has a corresponding time slot and the microprocessor 700 loads the identity of the time slot into time slot control 730 over bus 702. The microprocessor 700 also loads the first nibble of the provisioning and control message into the eight bit parallel to serial register 720. The PCM data is being transmitted from input 132b to bus 106 through the line interface circuitry of a bi-polar to unipolar converter 740, a framer 750, and a framing generator 760 which are typically located in various areas of the D4 system. The operations of these components are well known and do not form a part of the teachings of the present invention. The PCM voice data as shown in FIG. 2 (Frames) is delivered on line 762 and into a multiplexer 770. The multiplexer 770 operates under the teachings of the present invention as follows. When the time slot corresponding to the identified channel unit appears in each frame, the time slot control 730 causes the transmit register 720 to serially output the eight bits so as to superpose them according to the teachings of FIG. 4 over the voice data bits. The multiplexer 770 is designed to double the bandwidth of the voice data bit region of the identified time slot thereby expanding the transmission space to incorporate the provisioning data. Each subsequent frame contains an additional nibble of the provisioning and control message. This continues until the entire message is sent to the identified channel unit. As explained, the voice data is not interfered with and the voice data communication occurs as normal.

When a channel unit wants to communicate status information back to the line interface unit 130, the PCM data (Transmit Superframes of FIG. 5) appears on the transmit PCM bus 104. This PCM transmission accesses the framer 780 for delivery to the signaling bit restoral circuit 782, framing generator 784, and through the unipolar to bipolar converter 786 for delivery onto bus 132a. The framer 780 is added under the teachings of the present invention to identify time slots corresponding to frames 6 and 12 (conventional A and B signaling). When those frames are sensed a control signal is delivered on line 792 to the receive eight bit serial to parallel register 790. For example, bits $D_7$ and $D_6$, as shown, are then delivered over line 794 from the PCM data stream into register 790. As shown in Table I, four alternating superframes are required to fully transmit this information. When the full eight bit message segment is received, it is delivered over bus 702 to the microprocessor which determines what action needs to take place.

The signaling bit restoral circuit 782 places the prior binary state for the signaling bit into the current state. This is illustrated in Table II;

TABLE II

| Super-Frame | Original Signal | | Line 104 | | Line 132a | |
|---|---|---|---|---|---|---|
| | A | B | A | B | A | B |
| 2 | 1 | 1 | 1 | 1 | 1 | 1 |
| 3 | 1 | 0 | D7 | D6 | 1 | 1 |
| 4 | 0 | 0 | 0 | 0 | 0 | 0 |
| 5 | 1 | 0 | D5 | D4 | 0 | 0 |
| 6 | 1 | 0 | 1 | 0 | 1 | 0 |
| 7 | 0 | 1 | D3 | D2 | 1 | 0 |
| 8 | 0 | 1 | 0 | 1 | 0 | 1 |
| 9 | 1 | 1 | D1 | D0 | 0 | 1 |

The "original signal" illustrates an example of binary values in the A and B Signaling Frames before adding D0-D7. The signaling bit restoral circuit 782 preserves the prior state and, therefore, some distortion occurs.

In conclusion, it can be observed that the line interface unit 130 when modified according to the teachings of the preset invention discussed above, provides for two-way communication based upon the receive derision protocol and the transmit direction protocol superposes provisioning and control data into an increased bandwidth of an identified time slot corresponding to an identified channel unit whiteout affecting the voice data appearing on the PCM bus. Likewise, the transmit direction protocol borrows every other A and B signaling bit in order to transmit, two bits at a time, an eight bit message to register 790. Again, the transmitted PCM voice data is not altered under the protocol. However, some distortion to the signaling bits occurs through a fifty percent reduction in signaling bandwidth although this is minimized by preserving the prior signaling bit status and continuing it as through unchanged.

Figure 8:
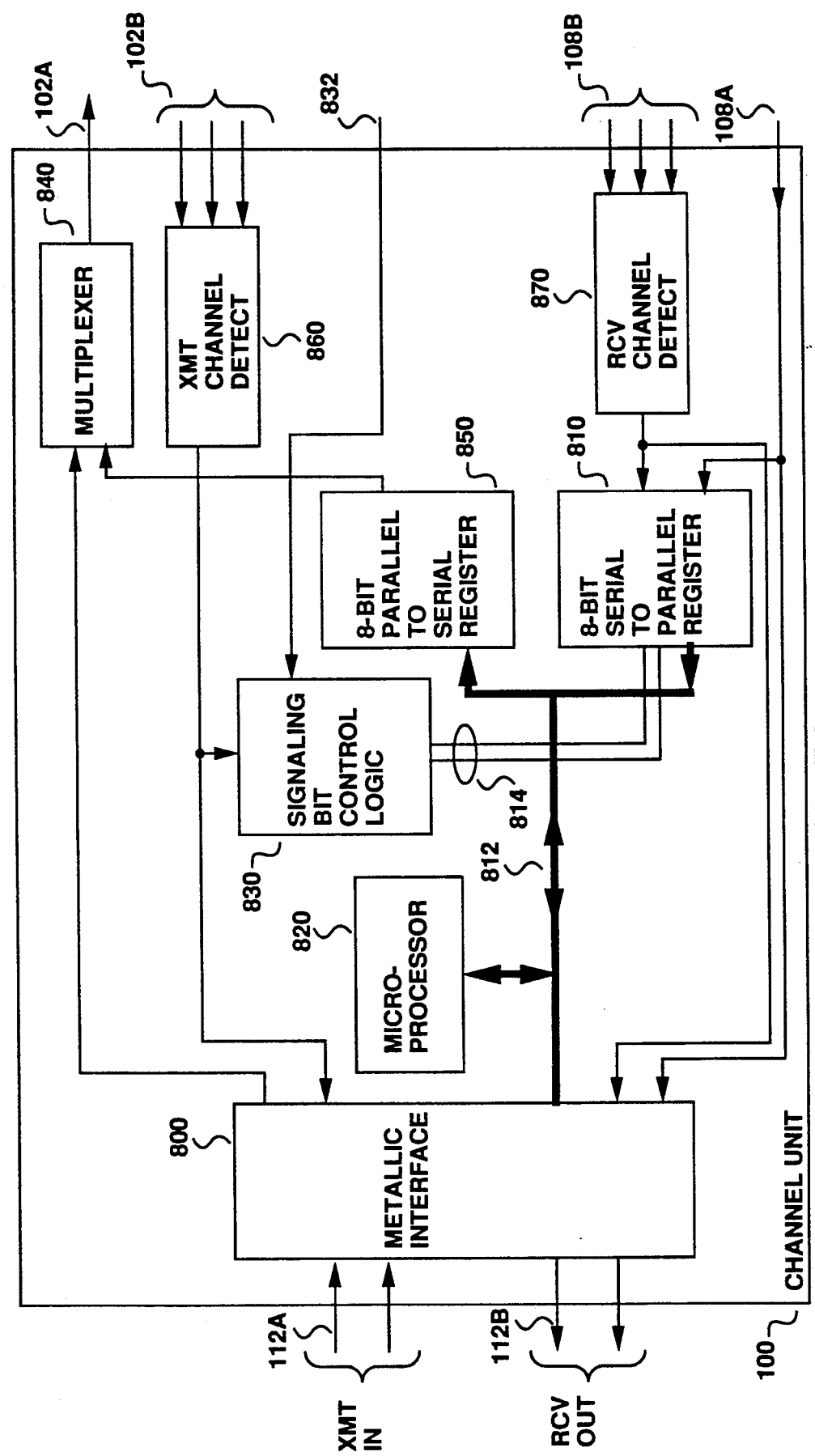
FIG. 8 is the block diagram schematic of the modified channel unit of the present invention.

In FIG. 8, the modifications to the channel unit 100 are shown. It is to be understood that other components in the channel unit necessary for the operation of the channel unit are not shown but that the block diagram of FIG. 8 concentrates on the modification to a conventional channel unit.

4. Modifications of Channel Unit 100

The channel unit 100 communicates with the analog voice telephone circuit 112 through a metallic interface 800. The metallic interface 800 is conventional in channel bank design. The channel unit 100 receives the PCM voice data as shown in FIG. 3 over lines 108a and further receives timing information over liens 108b from the receive unit 12. The PCM data as shown in FIGS. 5 and 6 is transmitted out from the channel unit 100 over ut 102a and the transmit channel timing and superframe sync signals are delivered over lines 10b and line 832, respectively into the channel unit 100 from the transmit unit 110.

In operation, the superposed voice data and provisioning data appearing on PCM bus 108a and as shown in FIG. 4 is delivered into the channel unit 100. An eight bit serial to parallel register 810 responds to the RCLKN edges 410 to get in the provisioning data into the eight bit register 810. Hence, the eight bits of the provisioning data are stored in register 810. Six bits of the data 10 through 13, FRM, and VNI are delivered on bus 812 and into the microprocessor 820. The microprocessor 820 implements a state machine to configure the channel unit 100 according to the delivered message, which is not a part of the present invention. What is important is that four bits of provisioning information has been communicated from the line interface unit to the channel unit over a conventional PCM line without interference with the voice data or without excluding the voice data. The data enable (DE) and the line interface ready bits (LRY) along with the superframe sync signal 832 are delivered over lines 814 to a signaling bit control logic circuit 830. This circuitry 830 produces the LRY, DE and signaling identifier signal configurations as shown in FIGS. 5 and 6 and controls the multiplexer 840 to deliver status data back to the line interface unit. When the microprocessor 820 desires to send status information back to the line interface unit, the appropriate status message is delivered to bus 812 into an eight bit parallel to serial register and, as set forth in Tables I and II, the eight bit message is delivered under control logic 830 into the multiplexer 840 in the precise bit slot position for delivery back into the line interface unit. Again, the present invention does not pertain to the nature of these status messages or how they are obtained internally on the channel unit 100. However, the microprocessor 820 generates such status messages for delivery onto bus 812 for storage in the eight bit register 850 and for delivery according to the transmit direction protocol into the line interface unit.

The transmit channel detect circuit 860 and the receive channel detect circuit 870 are conventional in the design of channel units 100 and provide the proper frame and time slot timing to the control logic 830 and the eight bit register 810 so as to enable the pick of provisioning data from PCM bus 108a and delivery of status data to PCM bus 102a.

It is to be expressly understood that the claimed invention is not to be limited to the description of the preferred embodiment but encompasses other modifications and alterations within the scope and spirit of the inventive concept.

We claim:

1. A method of communicating data from a line interface unit to an identified channel unit in a channel bank containing a plurality of channel units over the receive PCM communications bus carrying PCM voice data in time slots, said method comprising the steps of:
    increasing the bandwidth of only the voice data region in the time slot corresponding to the identified channel unit,
    superposing the data in the time slot with the PCM voice data without interfering with the voice data, and
    delivering the time slot having the increased bandwidth and containing the superposed data with the PCM voice data to the identified channel unit.

2. The method of claim 1 wherein the step of increasing the bandwidth causes the bandwidth of the voice data region of the time slot to double.

3. A method of communicating data to a channel unit in a channel bank containing a plurality of channel units over the PCM communications bus carrying PCM voice data in time slots, said data providing provisioning and control information enabling said channel unit to perform automatic operations, said method comprising the steps of:
    identifying the channel unit to which data is to be delivered, increasing the bandwidth of the voice data region in the time slot corresponding to the identified channel unit, superposing the data in the time slot with the PCM voice data without interfering with the voice data, delivering the time slot having the increased bandwidth and containing the superposed data with the PCM voice data to the identified channel unit, and separating in the identified channel unit the data from the voice data in the time slot.

4. A method of communicating provisioning and control data to a channel unit in a channel bank containing a plurality of channel units over the PCM communications bus carrying PCM voice data in time slots, said provisioning and control data providing information enabling said channel unit to perform automatic operations, said method comprising the steps of:

increasing the bandwidth of the voice data region in the time slot corresponding to the identified channel unit, superposing the provisioning and control data in the time slot with the voice data without interfering with the voice data, delivering the time slot having the increased bandwidth and containing the superposed provisioning data with the voice data to the identified channel unit, and separating in the identified channel unit the provisioning data from the voice data in the time slot.

5. A method of communicating provisioning and control data to a channel unit in a channel bank containing a plurality of channel units over the PCM communications bus carrying PCM voice data in time slots, said provisioning and control data providing information enabling said channel unit to perform automatic operations, said method comprising the steps of:

delivering the provisioning and control data for an identified channel unit to the line interface unit from a remote location, doubling the bandwidth of the voice data region in the time slot corresponding to the identified channel unit, superposing the provisioning and control data in the time slot with the voice data so that every other bit in the time slot is a voice data bit and without interfering with the voice data, delivering the time slot having the doubled bandwidth and containing the superposed provisioning data with the voice data to the identified channel unit, and separating in the identified channel unit the provisioning data from the voice data in the time slot.

6. A method of two-way communication between a channel unit and a line interface unit in a channel bank containing a plurality of channel units over the PCM communications bus, said method comprising the steps of:

providing communication of receive data from the line interface unit to an identified channel unit by:

(a) doubling the bandwidth only of the voice data region in the time slot corresponding to the identified channel unit, (b) superposing the receive data in the time slot with the voice data with every other bit in the time slot a voice data bit without interfering with the voice data, and (c) delivering the time slot having the increased bandwidth and containing the superposed receive data with the voice data to the identified channel unit over the PCM communications bus, providing communication of transmit data from a channel unit to the line interface unit by:

(a) replacing the A and B signaling bits in the time slots of every other superframe corresponding to the channel unit with the transmit data, and (b) delivering the time slots having the replaced A and B signaling bits over the PCM communications bus to the line interface unit.

7. A method of two-way communication between a channel unit and a line interface unit in a channel bank containing a plurality of channel units over the PCM communications bus, said method comprising the steps of:

providing communication of receive data from the line interface unit to an identified channel unit by:

(a) increasing the bandwidth only of the voice data region in the time slot corresponding to the identified channel unit, (b) superposing the receive data in the time slot with the voice data without interfering with the voice data, and (c) delivering the time slot having the increased bandwidth and containing the superposed receive data with the voice data to the identified channel unit over the PCM communications bus, providing communication of transmit data from a channel unit to the line interface unit by:

(a) replacing the A and B signaling bits in the time slots of every other superframe corresponding to the channel unit with the transmit data, and (b) delivering the time slots having the replaced A and B signaling bits over the PCM communications bus to the line interface unit.

8. A method of two-way communication between a channel unit and a line interface unit in a channel bank containing a plurality of channel units over the PCM communications bus, said method comprising the steps of:

providing communication of receive data from the line interface unit to an identified channel unit by superposing the receive data in an increased bandwidth region of the time slot corresponding to the identified channel unit with the voice data and without interfering with the voice data, and providing communication of transmit data from a channel unit to the line interface unit by replacing the A and B signaling bits in the time slots of every other superframe corresponding to the channel unit with the transmit data.

9. The method of claim 8 wherein the step of providing communication of transmit data further includes the step of transmitting from the line interface unit the state of the prior A and B signaling bits for the A and B signaling bits replaced with the transmit data.

10. A method of providing communication of transmit data from a channel unit to a line interface unit in a channel bank over a PCM communications bus, said method comprising the steps of:

(a) replacing the A and B signaling bits in the time slots of every other superframe corresponding to the channel unit with the transmit data, (b) delivering the time slots having the replaced A and B signaling bits over the PCM communications bus to the line interface unit, and (c) transmitting from the line interface unit the state of the prior A and B signaling bits for the A and B signaling bits replaced with the transmit data.

11. A method of communicating data from a line interface unit to an identified channel unit in a channel bank containing a plurality of channel units over the receive PCM communications bus carrying PCM data in time slots, said method comprising the steps of:

increasing the bandwidth of the data region in the time slot corresponding to the identified channel unit, superposing the data in the time slot with the PCM data without interfering with the PCM data, and delivering the time slot having the increased bandwidth and containing the superposed data with the PCM data to the identified channel unit.

12. A method of bi-directional communications over a communications bus between a line interface unit and an identified channel unit in a channel bank containing a plurality of channel units, said communications bus carrying PCM data in time slots, said method comprising the steps of:

increasing the bandwidth of only the data region in the time slot corresponding to the identified channel unit, superposing the communications data in the time slot with the PCM data without interfering with the PCM data, and delivering the time slot having the increased bandwidth and containing the superposed data with the PCM data over the communications bus.

* * * * *

UNITED STATES PATENT AND TRADEMARK OFFICE
CERTIFICATE OF CORRECTION

PATENT NO.    :  5,197,068
DATED         :  Mar. 23, 1993
INVENTOR(S)   :  Holien et al.

Page 1 of 2

It is certified that error appears in the above-indentified patent and that said Letters Patent is hereby corrected as shown below:

```
Title page, abstract, line 1, delete "providimg" and substitute
      --providing--
Title page, abstract, line 16, delete "is" and substitute --are--
Column 1, line 13, delete "control," and substitute --control--
Column 1, line 46, delete "are" and substitute --is--
Column 1, line 47, delete "are" and substitute --is--
Column 1, line 63, delete "receiver" and substitute --receive--
Column 1, line 64, delete "Signal" and substitute --signal--
Column 1, line 65, delete "unit" and substitute --unit 100a--
Column 2, line 2, delete "a"
Column 2, line 7, delete "but" and substitute --bus--
Column 3, line 41, delete "operates" and substitute --operate--
Column 4, line 26, delete "provides" and substitute --provide--
Column 4, line 50, delete "busses" and substitute --busses 106--
Column 5, line 21, delete "provisioninq" and substitute --provisioning--
Column 5, line 33, delete "Kb/s" and substitute --Kb/s),--
Column 7, line 65, delete "712 702" and substitute --712 through the
      communications interface 710 and over bus 702--
Column 9, line 5, delete "II;" and substitute --II:--
Column 9, line 24, delete "preset" and substitute --present--
Column 9, line 23, delete "derision" and substitute --direction--
Column 9, line 26, delete "protocol superposes" and substitute
      --protocol discussed earlier herein. Messages of any length can
      be transferred, eight bit segments at a time, in either
      direction. The receive direction protocol superposes--
Column 9, line 29, delete "whiteout" and substitute --without--
Column 9, line 38, delete "through" and substitute --though--
Column 9, line 43, delete "modification" and substitute
      --modifications--
Column 9, line 52, delete "liens" and substitute --lines--
```

UNITED STATES PATENT AND TRADEMARK OFFICE
CERTIFICATE OF CORRECTION

PATENT NO. : 5,197,068
DATED : Mar. 23, 1993
INVENTOR(S) : Holien et al.

It is certified that error appears in the above-indentified patent and that said Letters Patent is hereby corrected as shown below:

```
Column 9, line 53, delete "12" and substitute --120--
Column 9, line 55, delete "ut" and substitute --bus--
Column 9, line 56, delete "10b" and substitute --102b--
Column 9, line 61, delete "is" and substitute --are--
Column 9, line 63, delete "get" and substitute --gate--
Column 9, line 66, delete "10 through 13" and substitute --I0
     through I3--
```

Signed and Sealed this

First Day of March, 1994

Attest:

BRUCE LEHMAN

*Attesting Officer*　　*Commissioner of Patents and Trademarks*